US008327350B2

(12) United States Patent
Chess et al.

(10) Patent No.: US 8,327,350 B2
(45) Date of Patent: Dec. 4, 2012

(54) VIRTUAL RESOURCE TEMPLATES

(75) Inventors: David Michael Chess, Mohegan Lake, NY (US); Alberto Giammaria, Austin, TX (US); James Edwin Hanson, Yorktown Heights, NY (US); Robert Lee Orr, Raleigh, NC (US); Hidayatullah Habeebullah Shaikh, Mohegan Lake, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 11/618,946

(22) Filed: Jan. 2, 2007

(65) Prior Publication Data

US 2008/0163171 A1  Jul. 3, 2008

(51) Int. Cl.
G06F 9/445 (2006.01)
(52) U.S. Cl. ......... 717/177; 717/174; 717/175; 717/176
(58) Field of Classification Search .................. None
See application file for complete search history.

(56) References Cited

U.S. PATENT DOCUMENTS

| | | | |
|---|---|---|---|
| 4,674,038 A | 6/1987 | Brelsford et al. | |
| 5,682,535 A | 10/1997 | Knudsen | |
| 5,807,790 A | 9/1998 | Gupta et al. | |
| 6,094,528 A | 7/2000 | Jordan | |
| 6,510,448 B1 | 1/2003 | Churchyard | |
| 6,633,916 B2 | 10/2003 | Kauffman | |
| 6,734,873 B1 | 5/2004 | Herf et al. | |
| 6,775,699 B1 | 8/2004 | DeLuca et al. | |
| 6,802,062 B1 | 10/2004 | Oyamada et al. | |
| 6,848,106 B1 * | 1/2005 | Hipp | 719/312 |
| 6,917,963 B1 | 7/2005 | Hipp et al. | |
| 6,941,410 B1 | 9/2005 | Traversat et al. | |
| 7,013,462 B2 | 3/2006 | Zara et al. | |
| 7,093,247 B2 | 8/2006 | Ashworth et al. | |
| 7,127,713 B2 | 10/2006 | Davis et al. | |
| 7,131,122 B1 | 10/2006 | Lakhdhir | |
| 7,142,848 B2 | 11/2006 | Owen et al. | |
| 7,150,015 B2 | 12/2006 | Pace et al. | |
| 7,206,827 B2 * | 4/2007 | Viswanath et al. | 709/220 |
| 7,313,793 B2 * | 12/2007 | Traut et al. | 718/1 |

(Continued)

FOREIGN PATENT DOCUMENTS

JP   2004005650 A   1/2004

(Continued)

OTHER PUBLICATIONS

Krsul et al., "VMPlants: Providing and Managing Virtual Machine Execution Environments for Grid Computing", ACM Digital Library, 2004 IEEE, pp. 1-12.

(Continued)

Primary Examiner — Insun Kang
(74) Attorney, Agent, or Firm — Yee & Associates, P.C.; Anne Dougherty

(57) ABSTRACT

A computer implemented method, data processing system, and computer usable program code are provided for creating a set of virtual machine image for software. A virtual software resource template is retrieved. Metadata associated with the virtual software resource template is copied and the copy of the metadata is modified to generate personalized metadata for each virtual machine image in the set of virtual machine images. Then, the set of virtual machine images is deployed using the personalized metadata.

22 Claims, 5 Drawing Sheets

U.S. PATENT DOCUMENTS

| | | | |
|---|---|---|---|
| 7,356,679 B1* | 4/2008 | Le et al. | 713/1 |
| 7,376,693 B2 | 5/2008 | Neiman et al. | |
| 7,478,387 B2 | 1/2009 | Abelite et al. | |
| 7,506,336 B1 | 3/2009 | Ninan | |
| 7,506,338 B2 | 3/2009 | Alpern et al. | |
| 7,587,453 B2 | 9/2009 | Bhrara et al. | |
| 7,590,983 B2 | 9/2009 | Neiman et al. | |
| 7,603,443 B2 | 10/2009 | Fong et al. | |
| 7,676,803 B2 | 3/2010 | Zhao et al. | |
| 7,730,183 B2 | 6/2010 | Brown et al. | |
| 7,730,480 B2 | 6/2010 | Isaacson | |
| 7,743,363 B2* | 6/2010 | Brumme et al. | 717/120 |
| 7,761,865 B2 | 7/2010 | Stienhans et al. | |
| 7,779,091 B2 | 8/2010 | Wilkinson et al. | |
| 7,865,888 B1 | 1/2011 | Qureshi et al. | |
| 7,870,153 B2 | 1/2011 | Croft et al. | |
| 7,908,313 B2 | 3/2011 | Lurie et al. | |
| 7,949,677 B2 | 5/2011 | Croft et al. | |
| 7,954,087 B2 | 5/2011 | Zenz et al. | |
| 8,078,824 B2 | 12/2011 | Sugumar et al. | |
| 8,108,855 B2 | 1/2012 | Dias et al. | |
| 8,145,751 B2 | 3/2012 | Creamer et al. | |
| 8,145,760 B2 | 3/2012 | Dinda et al. | |
| 8,191,060 B2 | 5/2012 | Malasky et al. | |
| 2002/0065877 A1* | 5/2002 | Kowtko et al. | 709/203 |
| 2004/0010598 A1* | 1/2004 | Bales et al. | 709/228 |
| 2004/0015968 A1* | 1/2004 | Neiman et al. | 718/100 |
| 2004/0060048 A1 | 3/2004 | Abelite et al. | |
| 2005/0041588 A1 | 2/2005 | Kim et al. | |
| 2005/0050175 A1 | 3/2005 | Fong et al. | |
| 2005/0191991 A1* | 9/2005 | Owen et al. | 455/411 |
| 2005/0268280 A1* | 12/2005 | Fildebrandt | 717/113 |
| 2006/0155674 A1* | 7/2006 | Traut et al. | 707/2 |
| 2006/0184936 A1* | 8/2006 | Abels et al. | 718/1 |
| 2006/0184937 A1 | 8/2006 | Abels et al. | |
| 2006/0277542 A1 | 12/2006 | Wipfel | |
| 2007/0006205 A1* | 1/2007 | Kennedy et al. | 717/168 |
| 2007/0046791 A1* | 3/2007 | Wang et al. | 348/231.6 |
| 2007/0089111 A1* | 4/2007 | Robinson et al. | 718/1 |
| 2007/0124731 A1* | 5/2007 | Neiman et al. | 718/100 |
| 2007/0157172 A1* | 7/2007 | Zenz et al. | 717/121 |
| 2007/0157185 A1* | 7/2007 | Semerdzhiev et al. | 717/148 |
| 2007/0162892 A1* | 7/2007 | Zenz et al. | 717/121 |
| 2007/0233881 A1* | 10/2007 | Nochta et al. | 709/228 |
| 2007/0234334 A1* | 10/2007 | Araujo et al. | 717/168 |
| 2007/0234337 A1* | 10/2007 | Suzuki et al. | 717/168 |
| 2007/0234356 A1* | 10/2007 | Martins et al. | 718/1 |
| 2007/0283314 A1* | 12/2007 | Browning et al. | 717/100 |
| 2007/0294676 A1* | 12/2007 | Mellor et al. | 717/139 |
| 2007/0300220 A1* | 12/2007 | Seliger et al. | 718/1 |
| 2007/0300221 A1* | 12/2007 | Hartz et al. | 718/1 |
| 2008/0034071 A1* | 2/2008 | Wilkinson et al. | 709/220 |
| 2008/0127169 A1* | 5/2008 | Malasky et al. | 717/174 |
| 2008/0155537 A1* | 6/2008 | Dinda et al. | 718/1 |
| 2008/0163194 A1 | 7/2008 | Dias et al. | |
| 2008/0184225 A1* | 7/2008 | Fitzgerald et al. | 718/1 |
| 2008/0222234 A1* | 9/2008 | Marchand | 709/201 |
| 2009/0089860 A1* | 4/2009 | Forrester et al. | 726/3 |
| 2009/0113395 A1* | 4/2009 | Creamer et al. | 717/126 |
| 2009/0276771 A1* | 11/2009 | Nickolov et al. | 717/177 |
| 2010/0083218 A1* | 4/2010 | Bender | 717/106 |
| 2011/0119670 A1* | 5/2011 | Sugumar et al. | 718/1 |
| 2011/0119748 A1* | 5/2011 | Edwards et al. | 726/12 |

FOREIGN PATENT DOCUMENTS

| | | |
|---|---|---|
| JP | 2005174201 A | 6/2005 |
| JP | 2005292956 A | 10/2005 |
| WO | 03021516 A1 | 3/2003 |

OTHER PUBLICATIONS

Snyder et al., "Visibility Sorting and Compositing without Splitting for Image Layer Decompositions", ACM Digital Library, Proceedings of the 25th annual conference on Computer graphics and interactive techniques, 1998, pp. 219-230.

Kherfi et al., "Image Retrieval from the World Wide Web: Issues, Techniques, and Systems", ACM Computing Surveys, vol. 36, No. 1, Mar. 2004, pp. 35-67.

Figueiredo et al., "A Case for Grid Computing on Virtual Machines", Proceedings of the 23rd International Conference on Distributed Computing Systems, pp. 1-10, May 22, 2003, URL:http://ieeexplore.ieee.org/xpls/abs_all.jsp?arnumber=1203506>.

Sundararaj et al., "Towards Virtual Networks for Virtual Machine Grid Computing", Online, pp. 1-14, May 7, 2004, URL:http://portal.acm.org/citation.cfm?id=1267242.1267256>.

Canon et al., "Virtual Machine Emulation Facility for Performance Evaluation," International Business Machines Corporation, IBM Technical Disclosure Bulletin, Dec. 1978, pp. 3004-3005.

Crameri et al., "Staged Deployment in Mirage, an Integrated Software Upgrade Testing and Distribution System," SOSP'07, Stevenson, Washington, Oct. 14-17, 2007, pp. 221-236.

Nicolae et al., "Going Back and Forth: Efficient Multideployment and Multisnapshotting on Clouds," HPDC'11, San Jose, California, Jun. 8-11, 2011, pp. 147-158.

Villa et al., "Scalable Transparent Checkpoint-Restart of Global Address Space Applications on Virtual Machines Over Infiniband," CF'09, Ischia, Italy, May 18-20, 2009, pp. 197-206.

Wolinsky et al., "On the Design of Virtual Machine Sandboxes for Distributed Computing in Wide-Area Overlays of Virtual Workstations," IEEE VTDC, Second International Workshop on Virtualization Technology in Distributed Computing, Tampa, Florida, Nov. 17, 2006, 8 pages.

International Search Report regarding International Application No. PCT/EP2007/064117, dated Mar. 13, 2008, 10 pages.

Office Action regarding U.S. Appl. No. 11/854,185, dated May 24, 2011, 23 pages.

Response to Office Action regarding U.S. Appl. No. 11/854,185, dated Aug. 24, 2011, 20 pages.

Notice of Allowance regarding U.S. Appl. No. 11/854,185, dated Sep. 27, 2011, 16 pages.

* cited by examiner

302 ↘

TABLE

| MAJOR COMPONENTS | REQUIRED COMPONENTS MIDDLEWARE |
|---|---|
| DATA SERVER | DB2 UDB ESE V8.2<br>ITDS V5.2<br>BPEDP<br>LDAP DB<br>PORTAL DB |
| UI SERVER | WEBSPHERE PORTAL V5.1<br>ITDS CLIENT V5.2 |
| PROCESS SERVER | WBI-SF V5.1<br>ITDS CLIENT V5.2 |
| APPLICATION SERVER | WAS ND V5.1<br>ITDS CLIENT V5.2<br>DB2 ALPHABLOX V8.2 |
| CLI CLIENT | WAS APPLICATION CLIENT V5.1 |

TABLE

| TOPOLOGIES | TOPOLOGY NODES/VM IMAGES | MAJOR COMPONENTS FOR EACH NODE |
|---|---|---|
| SINGLE SERVER + CLIENT | A<br>B | CLI CLIENT (A)<br>DATA SERVER (B)<br>UI (B)<br>PROCESS SERVER (B)<br>APPLICATION SERVER (B) |
| TWO SERVERS + CLIENT | A<br>C<br>D | CLI CLIENT (A)<br>DATA SERVER (C)<br>UI (D)<br>PROCESS SERVER (D)<br>APPLICATION SERVER (D) |
| FOUR SERVERS + CLIENT | A<br>C<br>E<br>F<br>G | CLI CLIENT (A)<br>DATA SERVER (C)<br>UI (F)<br>PROCESS SERVER (G)<br>APPLICATION SERVER (H) |

*FIG. 3B*

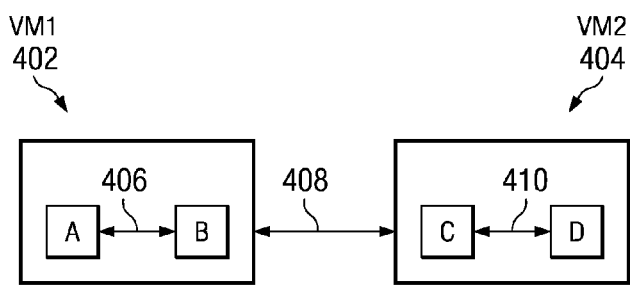

*FIG. 4*

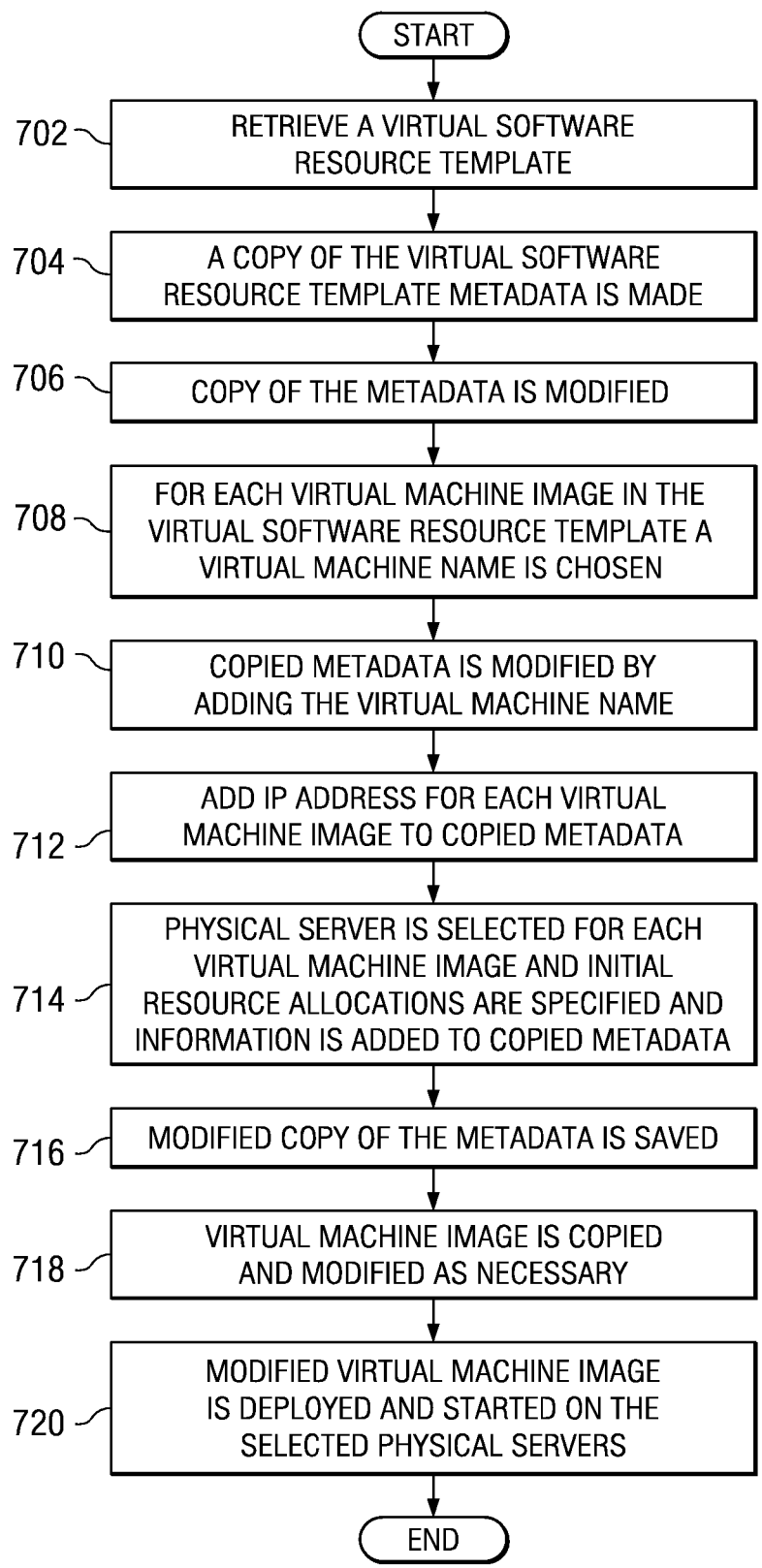

VIRTUAL RESOURCE TEMPLATES

BACKGROUND OF THE INVENTION

1. Field of the Invention

The present invention relates generally to data processing systems. More specifically, the present invention relates to a computer implemented method, data processing system, and computer usable program code for creating virtual machine images for software.

2. Description of the Related Art

In modern computing environments, it is becoming increasingly popular to distribute software solutions as a set of virtual machine (VM) images as opposed to the various single software components that make up the solutions. A virtual machine image is file representation of a virtual machine, the virtual machine devices, and all the installed software components. Virtualizers, like VMware® Server, instantiate and run virtual machines starting from their file-based representation or image. Distributing software solutions as virtual machine images is very appealing for both software vendors and customers because of the simplified, less error prone, deployment, and maintenance process.

For example, consider software solutions like the IT Service Management (ITSM) that comprises the components and supported topologies as shown in FIGS. 3A and 3B. Topologies represent a particular mapping between one or more software components of a solution and one or more machines or topology nodes where these components are installed. Usually, a solution may be deployed in one or more topologies.

Instead of distributing the sixteen different major components and required middleware components shown in table 302 in FIG. 3A, seven pre-configured virtual machine images containing the entire software stack in each of the different topology nodes may be distributed, as shown in table 304 in FIG. 3B. A software stack is a set of software components, such as an operating system, middleware, or application components, needed to deliver a fully functional subsystem. In the case of deploying the separate software components, the deployment process consists of installing and configuring all the components of the different software stack and then configuring their inter-connections. In the case of deploying virtual machines (VMs), the deployment process consists of deploying the virtual machines associated with a certain topology and configuring the external connections in each virtual machine so that each virtual machine communicates correctly with the other virtual machines in the topology. Also, the virtual machines are configured to communicate with any necessary services in the existing computing infrastructure into which the virtual machines are being configured.

However, current virtual machine technology is aimed at the process of creating, duplicating, and deploying virtual machines themselves without reference to the application(s) installed in the virtual machine images or to the dependencies among multiple virtual machines that fulfill various parts of a distributed application. Thus, it would be advantageous to have an improved method for managing software with minimal user intervention.

SUMMARY OF THE INVENTION

The different illustrative embodiments provide a computer implemented method, data processing system, and computer usable program code to create a set of virtual machine images for software. The illustrative embodiments retrieve a virtual software resource template. The illustrative embodiments copy metadata associated with the virtual software resource template. The illustrative embodiments modify the copy of the metadata to generate personalized metadata for each virtual machine image in the set of virtual machine images. The illustrative embodiments deploy the set of virtual machine images using the personalized metadata.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B are a set of tables illustrating a software solution to be distributed that comprises components and supported topologies in accordance with an exemplary embodiment;

FIG. 4 is a block diagram illustrating deployed virtual machine images in accordance with an exemplary embodiment;

FIG. 7 is a flowchart illustrating the operation of managing software in accordance with an exemplary embodiment.

DETAILED DESCRIPTION OF THE PREFERRED EMBODIMENT

Figure 1:
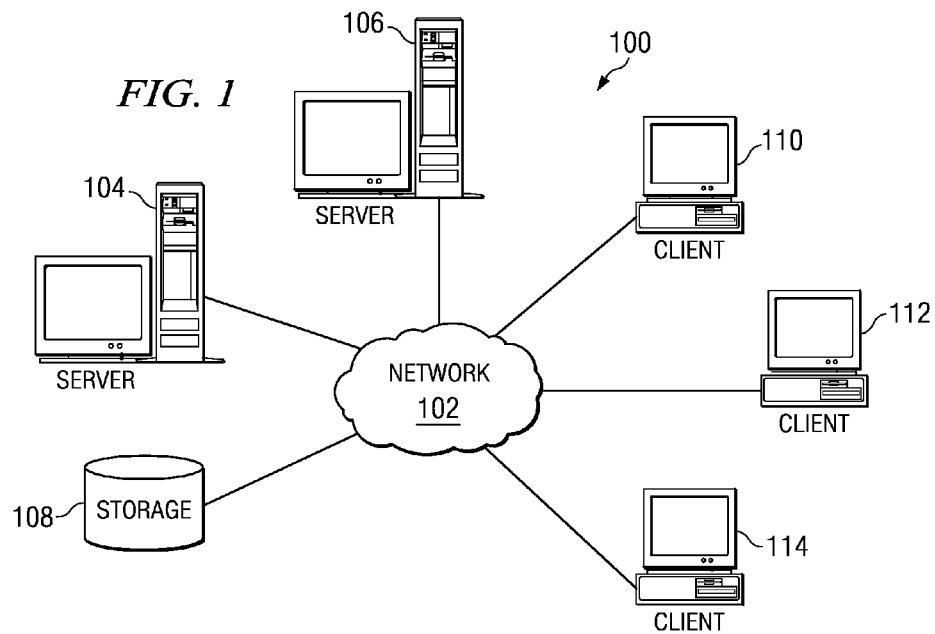
FIG. 1 is a pictorial representation of a network of data processing systems in which the exemplary embodiments may be implemented.
Figure 2:
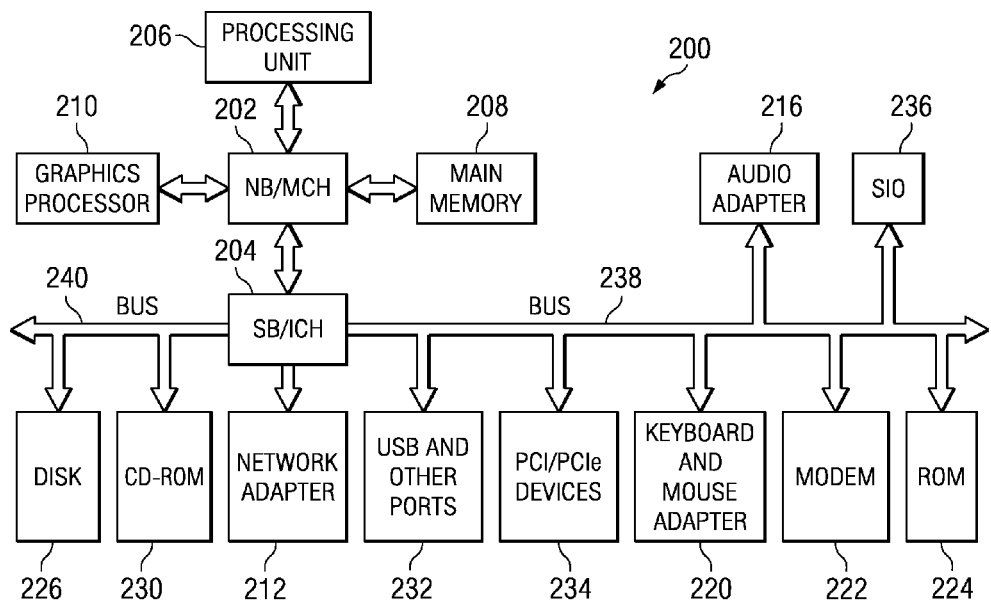
FIG. 2 is a block diagram of a data processing system in which the exemplary embodiments may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which the exemplary embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the exemplary embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or Linux® operating system (eServer, pseries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

An exemplary embodiment provides for managing software by deploying, configuring, and instantiating a software solution distributed as virtual machine images. A virtual machine image consists of an operating system, middleware, and application components. Depending on the topology, some of these components communicate with other components in the same virtual machine image, while other components communicate with components in other images.

Turning back to the figures, FIGS. 3A and 3B are a set of tables illustrating a software solution to be distributed that comprises components and supported topologies in accordance with an exemplary embodiment. Table 302 shows the components of a software solution. The first column contains entries for each of the major components. The second column contains entries for the required middleware components for the corresponding major component and regular component.

Table 304 shows the various topologies supported by the solution of table 302. The first column contains entries for each of the supported topologies. The second column contains entries for the names of the topology nodes or virtual machine images that comprise the supported topology entry in the first column. The third column contains entries for major components from table 302 that comprise the topology nodes in the entry of the second column. Following the name of each major component in the entry of the third column is the name of the specific topology node in the entry of the second column to which the major component belongs.

FIG. 4 is a block diagram illustrating deployed virtual machine images in accordance with an exemplary embodiment. The virtual machine images in FIG. 4 may be deployed by a data processing system, such as data processing system 200 in FIG. 2. There are two virtual machine images, VM1 402 and VM2 404. Virtual machine VM1 402 comprises components A and B. Virtual machine VM2 404 comprises components C and D. The connections between components A-B and C-D, connections 406 and 410, respectively, remains inside the boundary of the respective virtual machines while the connection between components B and D, connection 408, traverses the boundary of the virtual machines.

The connection between components A and B can be established and configured at the time of the creation of VM1 402 while the connection between components B and D needs to be established and configured at the time of deployment. FIG. 4 illustrates one of the reasons why deploying software solutions as virtual machine images is so appealing. That is, the customers need to handle only a fraction of the total dependencies between the solution components—the dependencies that cross the boundaries of the virtual machines.

In an exemplary embodiment, the virtual machine image is treated as a single software component with well identified access points. From this perspective, the specific components in a virtual machine, such as a Linux® operating system, a queue manager, and a database that is only used by the queue manager, is irrelevant. What is relevant is the designed role or capability of the virtual machine, such as a provider of a queue manager service and the access point(s) of the virtual machine. Some examples of access points are protocol, address, port, and any other parameter needed to connect to the virtual machine.

An exemplary embodiment provides for using metadata that describes hardware and software requirements of each virtual machine image, the services the virtual machine exposes with associated access points, the services that the virtual machine requires from other components in order to fulfill the role of the virtual machine in the overall system, and other related metadata. Since the metadata describes hardware and software requirements of each virtual machine image, the metadata may be considered personalized metadata.

An exemplary embodiment provides for a virtual software resource template (VSRT). A virtual software resource template is a collection of one or more freeze-dried software stack(s) with associated metadata. A freeze-dried software stack is a software stack comprised of pre-configured, pre-tuned, and hardened components, such as an operating system, an application server, a database, and a set of applications. A pre-tuned or hardened component is a component whose configuration, all the parameters that influence the behavior of the component at run time, has been already executed and the results stored in the virtual machine image. Examples of metadata information include, but are not limited to, information such as location of freeze-dried software stack volumes, hardware requirements such as CPU, memory, disk, network, and so forth, for hosting the virtual software resource template, external and internal virtual machine image dependencies, policies associated with capacity, configuration parameters for the solution, and so forth.

Virtual software resource templates (VSRTs) may be either simple or composite. A simple virtual software resource template, also called a base virtual software resource template, comprises a single software stack. That is, a base virtual software resource template comprises a virtual machine image and metadata for a single virtual machine. A composite virtual software resource template comprises multiple, finer grained software stacks. That is, a composite virtual software resource template comprises multiple virtual machine images and metadata for multiple virtual machines. Composite virtual software resource templates contain information about assembling a set of virtual software resource templates into a single distributed application or "solution". Virtual software resource templates may be deployed on a set of physical machines either by running in a virtual container or directly on physical machines like a blade. A virtual container is a program capable of instantiating and running virtual software resource templates, such as VMware® Server. When virtual software resource templates are instantiated on a set of physical machines, one or more virtual software resources (VSRs) are created. A virtual software resource is a resource that is deployed, configured, and running.

An exemplary embodiment provides for a base virtual software resource template comprised of the following metadata information: an identifier, a name, a description, disk image information, hardware profile, software profile, capabilities, configuration, scale-out/clustering, intra-virtual software resource template dependencies, and external dependencies.

An identifier is a globally unique identifier that may act as a primary key for machine identification of the software stack contained in the virtual machine image. A name is a unique name for human identification of the software stack. The description is a short description of the functionality provided by the software stack. Disk image information includes, for example, the location of the disk images. A hardware profile is the virtual machine image hardware requirements. These include, for example, CPU, memory, disk, network, and so forth. This information is used for resource matching during the deployment phase and results in the virtual machine definition.

A software profile includes detailed information about the software installed on the disk images. A disk image is the file image of a virtual disk. A virtual machine can have different virtual disks much like a physical machine can have different hard disks, for example, the OS version and release information. This information is particularly useful when the virtual software resource template is being extended vertically by the application or when the virtual software resource template is being upgraded, for example, by applying fix-packs to the middleware and/or operating system. Fix-packs are fixes software vendors rollout to the bugs found in their software that needs to be applied by customers on top of their existing software installation for the software to work properly. Capabilities are metadata that express or explain the capabilities provided by the software stack, for example, a J2EE™ application server or a servlet container and so forth. Configuration information is metadata that defines data that is needed for the solution to be customized and configured. The configuration data is provided during the deployment of the virtual software resource template.

Scale-out/clustering information is metadata that identifies the policies associated with scale-out of virtual software resource templates. A computer "cluster" is a group of loosely coupled computers that work together closely so that in many respects they can be viewed as though they are a single computer. Clusters are usually deployed to improve speed and/or reliability over that provided by a single computer, while typically being much more cost-effective than single computers of comparable speed or reliability. This technique of grouping computers is called "clustering". "Scale-out" in the exemplary embodiments is used to define machines, physical or virtual, that are clustered together to increase throughput and improve speed. The scale-out information is useful at runtime for optimal instantiation and placement of virtual machines. The intra-virtual software resource template dependencies are the dependencies between the various software stacks included in the composite virtual software resource template definition. For example, IT Service Management (ITSM) Command Line Interface (CLI) client software stack "uses" IT Service Management data server software stack. External dependencies are the dependencies between a software stack and external components. For example, a WebSphere® application server software stack might use a Lightweight Directory Access Protocol (LDAP) server for authentication.

An exemplary embodiment provides for a composite virtual software resource template comprised of the following metadata information: an identifier, a name, a version, a description, capabilities, capacity, cost of instantiation, and constituent virtual software resource templates. An identifier is a globally unique identifier that could act as a primary key for machine identification of the virtual software resource template. A name is a unique name for the human identification of a virtual software resource template. A version refers to the version of the virtual software resource template. The description is a short description of the functionality provided by the virtual software resource template. The description may function as a miniature README file for the solution. Capabilities are metadata that express or explain the capabilities provided by the virtual software resource template, for example, a J2EE™ application server, a servlet container, and so forth.

The capacity identifies the capacity of the virtual software resource template, provided that the hardware and software requirements are met. An example of capacity is the number of clients that the virtual software resource template is capable of serving. The cost of instantiation is metadata that identifies the cost associated with the instantiation of the virtual software resource template into a virtual software resource (VSR). Cost refers to the time taken to perform the function. The cost information can be used, for example, by a utility function to decide whether creating a new instance of a virtual software resource template in response to an increased workload of short duration would be worthwhile.

The constituent virtual software resource template's metadata comprises information about the virtual software resource template that make up the distributed application, such as, for example, IT Service Management (ITSM) data server, IT Service Management (ITSM) User Interface (UI) server, etc. The constituent virtual software resource template's metadata takes the form of one or more entries. Each entry comprises an identifier and a role. The identifier is the identifier of the base virtual software resource template. The role describes the role the software stack in the base virtual software resource template will play in the solution described by the composite virtual software resource template. For example, a WebSphere® application server software stack may play a role of a deployment manager or an application server or both. It should be noted that the constituent virtual software resource templates referred to in a composite virtual software resource template may themselves be either base or composite virtual software resource templates. Thus, composite virtual software resource templates may be nested.

Figure 5:
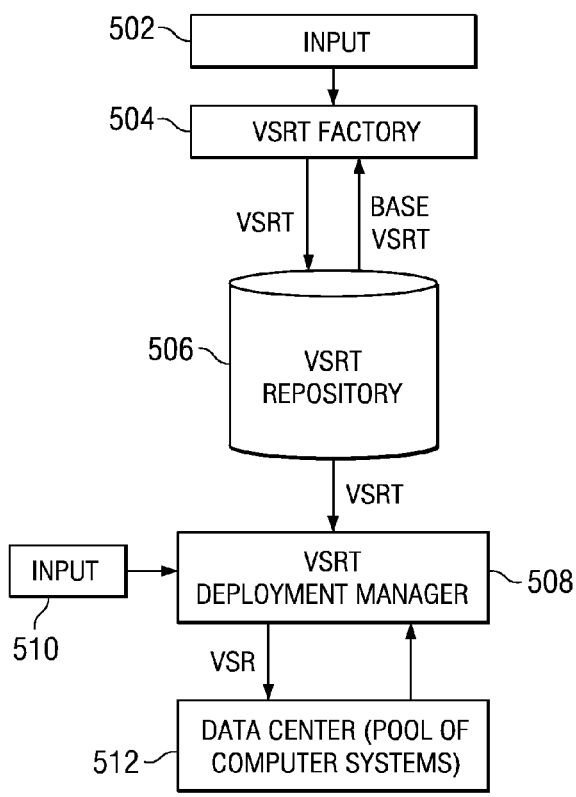
FIG. 5 is a block diagram of components that create and consume virtual software resource templates in accordance with an exemplary embodiment.

Turning back to the figures, FIG. 5 is a block diagram of components that create and consume virtual software resource templates in accordance with an exemplary embodiment. The components in FIG. 5 may be implemented on one or more data processing systems, such as data processing system 200 in FIG. 2. VSRT factory 504 is responsible for the production of virtual software resource templates, both base and composite virtual software resource templates, including the virtual machine images and associated metadata. VSRT factory 504 receives input 502 from which a virtual software resource template is built. VSRT factory 504 stores the virtual software resource template in VSRT repository 506.

Input 502 comprises various inputs including the logical application structure from the application developer, a logical topology, for example, a three (3) tier deployment of a typical web application versus two (2) tier deployment from a user who could be a domain expert, DB2 and other middleware base. VSRT factory 504 also receives base virtual software resource templates that are used as building blocks for other composite virtual software resource templates. For example, WebSphere® Application Server, DB2, and other middleware from VSRT repository 506. The inputs to VSRT factory 504 contain enough information to produce the virtual software resource template metadata required for a particular implementation.

VSRT deployment manager 508 is the consumer of the virtual software resource template metadata and virtual machine images. Apart from retrieving virtual software resource templates from VSRT repository 506, VSRT deployment manager 508 also receives input 510. Input 510 is user input, including input about the physical topology, information about the physical machines in the data center, and so forth. VSRT deployment manager 508 instantiates virtual software resources on the physical systems of data center 512. Virtual software resources are a set of virtual machines with configuration information associated with the software stack.

Figure 6:
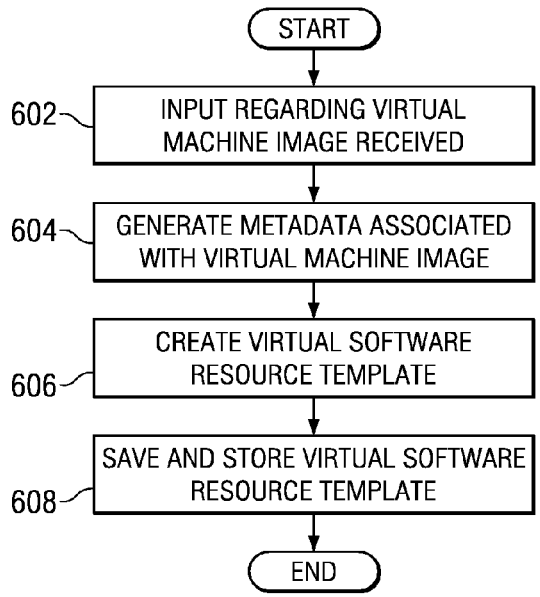
FIG. 6 is a flowchart illustrating the operation of creating a virtual software resource template in accordance with an exemplary embodiment.

FIG. 6 is a flowchart illustrating the operation of creating a virtual software resource template in accordance with an exemplary embodiment. The operation of FIG. 6 may be implemented in a virtual software resource template factory, such as VSRT factory 504 in FIG. 5. The operation begins when input regarding a virtual machine image is received (step 602). The received input comprises various inputs including the logical application structure from the application developer, a logical topology from a user who could be a domain expert, base virtual software resource templates that are building blocks, like WebSphere® Application Server, DB2®, and other middleware. The operation parses the received input to generate the metadata associated with the virtual machine image (step 604). Next, the operation creates a virtual software resource template that comprises the virtual machine image and generated metadata (step 606). The created virtual software resource template may either be a base virtual software resource template, comprising only one virtual machine image, or the created virtual software resource template may be a composite virtual software resource template, comprising a plurality of virtual machine images. Next, the operation saves and stores the virtual software resource template (step 608) and the operation ends.

FIG. 7 is a flowchart illustrating the operation of managing software in accordance with an exemplary embodiment. The operation of FIG. 7 may be implemented in a virtual software resource template deployment manager, such as VSRT deployment manager 508 in FIG. 5. The operation begins when the virtual software resource template deployment manager retrieves a virtual software resource template (step 702). A copy is made of the virtual software resource template metadata (step 704). The copy of the metadata is modified (step 706). The metadata is modified by adding two fields: the solution instance identifier and the solution instance name. The solution instance identifier and the solution instance name are analogous to the virtual software resource template identifier and name. However, the solution instance identifier and the solution instance name refer, not to the template, but to the particular instance of the solution, which is in the process of being deployed. The solution instance identifier and the solution instance name may be specified manually or automatically. In either case, the identifiers and names must be unique.

Next, for each virtual machine image in the virtual software resource template, a virtual machine name is chosen (step 708). The copied metadata is modified by adding the virtual machine names to the copied metadata (step 710). The virtual machine names may be specified manually, may be automatically chosen from a pre-specified list of available machine names, or may be generated dynamically, for example, based on the solution instance name and the role played by the base virtual software resource template.

The copied metadata is modified by adding an Internet Protocol (IP) address to the copied metadata for each virtual machine image (step 712). If dynamic IP addressing is not in use, an IP address is chosen. Next, utilizing the hardware profile information stored in the base virtual software resource template for each virtual machine image, a physical server is selected for each virtual machine image, and initial resource allocations, such as central processing unit, memory, and so forth, are specified and the information is augmented to the copied metadata (step 714). Next, the modified copy of the metadata is saved (step 716).

The virtual machine images are copied and modified as necessary (step 718). Modifications may include, but are not limited to, adding, to a given copy of a virtual machine image, information about the names and/or IP addresses that were chosen for the other virtual machines on which the given virtual machine will depend. Any other configuration parameters that vary from solution-instance to solution-instance are also specified at this time. The modified virtual machine images are deployed and started on the selected physical servers (step 720) and the operation ends. Because virtual machine images were previously configured with their dependency information, the solution instance is fully operational when it starts.

Thus, the exemplary embodiments provide for a simplified method of managing software. The software solution is managed by deploying, configuring, and instantiating the software solution distributed as virtual machine images.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a set of virtual machine images for software, the computer implemented method comprising:
   retrieving a virtual software resource template, wherein the virtual software resource template is a collection of one or more software stacks and wherein each of the one or more software stacks comprises components in which all parameters that influence a behavior of a component at run time have been executed and results from the execution stored in a virtual machine image;
   copying metadata associated with the virtual software resource template, wherein the metadata includes locations of one or more software stack volumes, hardware requirements for hosting the virtual software resource template, and external and internal virtual machine image dependencies;
   modifying a copy of the metadata to generate personalized metadata for each virtual machine image in the set of virtual machine images; and
   deploying the set of virtual machine images using the personalized metadata.

2. The computer implemented method of claim 1, wherein the personalized metadata associated with each virtual machine image describes dependencies and configuration parameters associated with the dependencies.

3. The computer implemented method of claim 2, wherein the dependencies are dependencies between the set of virtual machine images.

4. The computer implemented method of claim 2, wherein the dependencies are dependencies between a virtual machine image in the set of virtual machine images and external system components.

5. The computer implemented method of claim 1, wherein each virtual machine image is a virtual machine image with software stacks installed.

6. The computer implemented method of claim 1, wherein modifying the copy of the metadata to generate the personalized metadata further comprises:
   selecting a virtual machine name for each virtual machine image in the set of virtual machine images;
   adding an IP address for each virtual machine image in the set of virtual machine images;

selecting a physical server for each virtual machine image in the set of virtual machine images; and specifying initial resource allocations for each virtual machine image in the set of virtual machine images.

7. The computer implemented method of claim 1, further comprising:

storing the personalized metadata for each virtual machine image in the set of virtual machine images as the virtual software resource template.

8. The computer implemented method of claim 1, wherein the virtual software resource template comprises a virtual machine image and metadata for a single virtual machine.

9. The computer implemented method of claim 1, wherein the virtual software resource template comprises multiple virtual machine images and metadata for multiple virtual machines.

10. A data processing system comprising:

a bus system;

a communications system connected to the bus system;

a memory connected to the bus system, wherein the memory includes a set of instructions; and a processing unit connected to the bus system, wherein the processing unit executes the set of instructions to retrieve a virtual software resource template, wherein the virtual software resource template is a collection of one or more software stacks and wherein each of the one or more software stacks comprises components in which all parameters that influence a behavior of a component at run time have been executed and results from the execution stored in a virtual machine image; copy metadata associated with the virtual software resource template, wherein the metadata includes locations of one or more software stack volumes, hardware requirements for hosting the virtual software resource template, and external and internal virtual machine image dependencies; modify a copy of the metadata to generate personalized metadata for each virtual machine image in a set of virtual machine images; and deploy the set of virtual machine images using the personalized metadata.

11. The data processing system of claim 10, wherein the personalized metadata associated with each virtual machine image describes dependencies and configuration parameters associated with the dependencies.

12. The data processing system of claim 11, wherein the dependencies are dependencies between at least one of virtual machine images in the set of virtual machine images or a virtual machine image in the set of virtual machine images and external system components.

13. The data processing system of claim 10, wherein each virtual machine image is a virtual machine image with software stacks installed.

14. The data processing system of claim 10, wherein the processing unit executing the set of instructions to modify the copy of the metadata to generate the personalized metadata executes the set of instructions to select a virtual machine name for each virtual machine image in the set of virtual machine images; add an IP address for each virtual machine image in the set of virtual machine images; select a physical server for each virtual machine image in the set of virtual machine images; and specify initial resource allocations for each virtual machine image in the set of virtual machine images.

15. The data processing system of claim 10, wherein the processing unit executes the set of instructions to store the personalized metadata for each virtual machine image in the set of virtual machine images as the virtual software resource template.

16. A computer program product comprising:

a computer readable storage medium including computer usable program code for creating a set of virtual machine images for software, the computer program product including:

computer usable program code for retrieving a virtual software resource template;

computer usable program code for copying metadata associated with the virtual software resource template, wherein the virtual software resource template is a collection of one or more software stacks and wherein each of the one or more software stacks comprises components in which all parameters that influence a behavior of a component at run time have been executed and results from the execution stored in a virtual machine image;

computer usable program code for modifying a copy of the metadata to generate personalized metadata for each virtual machine image in the set of virtual machine images, wherein the metadata includes locations of one or more software stack volumes, hardware requirements for hosting the virtual software resource template, and external and internal virtual machine image dependencies; and computer usable program code for deploying the set of virtual machine images using the personalized metadata.

17. The computer program product of claim 16, wherein the personalized metadata associated with each virtual machine image describes dependencies and configuration parameters associated with the dependencies.

18. The computer program product of claim 17, wherein the dependencies are dependencies between the set of virtual machine images.

19. The computer program product of claim 17, wherein the dependencies are dependencies between a virtual machine image in the set of virtual machine images and external system components.

20. The computer program product of claim 16, wherein each virtual machine image is a virtual machine image with software stacks installed.

21. The computer program product of claim 16, wherein the computer usable program code for modifying the copy of the metadata to generate the personalized metadata further includes:

computer usable program code for selecting a virtual machine name for each virtual machine image in the set of virtual machine images;

computer usable program code for adding an IP address for each virtual machine image in the set of virtual machine images;

computer usable program code for selecting a physical server for each virtual machine image in the set of virtual machine images; and computer usable program code for specifying initial resource allocations for each virtual machine image in the set of virtual machine images.

22. The computer program product of claim 16, further including:

computer usable program code for storing the personalized metadata for each virtual machine image in the set of virtual machine images as the virtual software resource template.

* * * * *